US007219093B2

United States Patent
Whitney, IV

(10) Patent No.: US 7,219,093 B2
(45) Date of Patent: May 15, 2007

(54) SYSTEM AND METHOD FOR GENERATING CUSTOM HIERARCHIES IN AN ANALYTICAL DATA STRUCTURE

(75) Inventor: William Russell Whitney, IV, Boise, ID (US)

(73) Assignee: Proclarity Corporation, Boise, ID (US)

( * ) Notice: Subject to any disclaimer, the term of this patent is extended or adjusted under 35 U.S.C. 154(b) by 167 days.

(21) Appl. No.: 11/002,910

(22) Filed: Dec. 2, 2004

(65) Prior Publication Data
US 2005/0120018 A1    Jun. 2, 2005

Related U.S. Application Data

(60) Provisional application No. 60/526,246, filed on Dec. 2, 2003.

(51) Int. Cl.
*G06F 17/30* (2006.01)
(52) U.S. Cl. .................. 707/3; 707/1; 707/2; 707/5
(58) Field of Classification Search ............ 707/1–10, 707/101, 200, 100
See application file for complete search history.

(56) References Cited

U.S. PATENT DOCUMENTS

| | | | |
|---|---|---|---|
| 6,438,537 B1 * | 8/2002 | Netz et al. ............... | 707/3 |
| 6,643,646 B2 * | 11/2003 | Su et al. ................. | 707/6 |
| 2002/0126545 A1 * | 9/2002 | Warren et al. ........... | 365/200 |
| 2004/0006574 A1 * | 1/2004 | Witkowski et al. ...... | 707/104.1 |
| 2004/0103092 A1 * | 5/2004 | Tuzhilin et al. ......... | 707/3 |
| 2004/0181519 A1 * | 9/2004 | Anwar .................... | 707/3 |

* cited by examiner

*Primary Examiner*—Wilson Lee
*Assistant Examiner*—Marc Filipczyk
(74) *Attorney, Agent, or Firm*—Merchant & Gould

(57) ABSTRACT

(N+Q) dimensions of data can be analyzed in an N-dimensional native OLAP cube by submitting an (N+Q)-dimensional custom query and converting the (N+Q)-dimensional custom query into an N-dimensional query for submission to the N-dimensional native OLAP cube. An N-dimensional result of the N-dimensional query is provided and converted into an (N+Q)-dimensional result of the (N+Q)-dimensional custom query. The (N+Q) dimensional result is then provided as an answer to the (N+Q) dimensional custom query.

21 Claims, 4 Drawing Sheets

SYSTEM AND METHOD FOR GENERATING CUSTOM HIERARCHIES IN AN ANALYTICAL DATA STRUCTURE

CROSS-REFERENCE TO RELATED APPLICATION(S)

This application claims the benefit of U.S. Provisional Application No. 60/526,246 filed Dec. 2, 2003 for "Custom OLAP Hierachies" by William Russell Whitney IV.

INCORPORATION BY REFERENCE

The aforementioned U.S. Provisional Application No. 60/526,246 is hereby incorporated by reference in its entirety.

BACKGROUND OF THE INVENTION

The present invention relates to on-line analytical processing (OLAP) structures, and more particularly to a system and method for generating custom hierarchies in an OLAP structure that allows a user to alter the definition of the structure in an individualized manner that does not affect the actual definition of the structure for other users.

Data related to the performance and operation of a business has become essential in order for business managers to make informed decisions with respect to strategy, pricing, department structuring, and the like. Increasingly, this data is being stored in a database format, accessible by entering a query of some kind that sorts through the data and returns an answer based on the data that matches the criteria of the query. The database is often referred to as an OLAP cube, reflecting the multiple dimensions of data that are stored in the database.

Analysts employ a number of tools to manage and view the data stored in the OLAP cube. One of these tools is a query engine, which acts as a data server responding to requests from a business analyst to identify constituents of the OLAP cube that satisfy certain criteria. This feature allows analysts to obtain answers to certain questions about the data stored in the OLAP cube, for the purpose of forming conclusions as to business performance based on the data.

The query feature is somewhat limited by the fact that the definition of the OLAP cube is typically static, meaning that the organizational structure of the various data hierarchies in the cube cannot be changed by an analyst. As a result, the options for sorting and viewing the data contained in the cube are limited based on the organization of the cube. It is difficult, time-consuming and expensive to attempt to augment the definition of the cube in response to each individual analysts' desire to sort and view the data in a particular manner for a given project.

There is a need in the art for a system and method of creating custom data definitions, or hierarchies, from a predefined OLAP cube to allow individual analysts to perform data processing and analysis tailored to their business goals.

BRIEF SUMMARY OF THE INVENTION

The present invention allows (N+Q) dimensions of data to be analyzed in an N-dimensional native OLAP cube by submitting an (N+Q)-dimensional custom query and converting the (N+Q)-dimensional custom query into an N-dimensional query for submission to the N-dimensional native OLAP cube. An N-dimensional result of the N-dimensional query is provided and converted into an (N+Q)-dimensional result of the (N+Q)-dimensional custom query. The (N+Q) dimensional result is then provided as an answer to the (N+Q) dimensional custom query.

DETAILED DESCRIPTION

Figure 1:
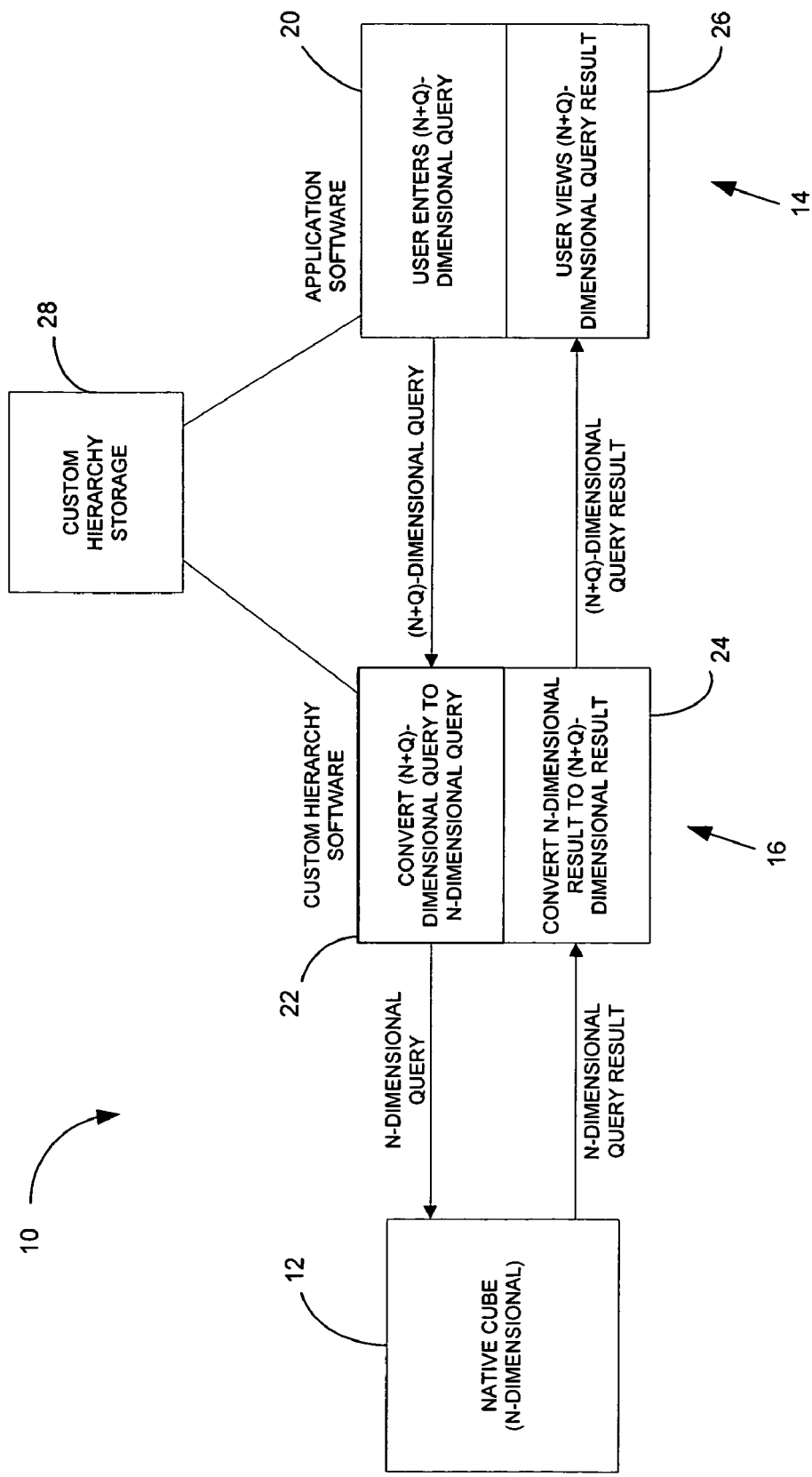
FIG. 1 is a diagram illustrating the general structure and operation of a system for creating custom hierarchies according to an exemplary embodiment of the present invention.

FIG. 1 is a diagram illustrating the general structure and operation of system 10 for creating custom hierarchies according to an exemplary embodiment of the present invention. The system assumes native OLAP cube 12 is provided, populated with data stored in a number of native hierarchies/dimensions (N-dimensional data). Native OLAP cube 12 also includes a database server having the capability of processing queries submitted with respect to the data stored in cube 12. System 10 also includes application software 14 for allowing a user to formulate a query for submission to native OLAP cube 12, and for allowing the user to view the data returned from native OLAP cube 12, often in a graphical or other visual format that aids the user's analysis of the data. In existing systems, application software 14 is coupled directly to native OLAP cube 12 for operation as described above. However, system 10 further includes custom hierarchy software 16 logically coupled between application software 14 and native OLAP cube 12. Custom hierarchy software 16 allows new functionality to be incorporated into application software 14, enabling users to submit queries and view results that relate to custom hierarchies/dimensions of data that are not defined in the structure of native OLAP cube 12.

In operation, a user enters a desired query as indicated at box 20. The query relates to dimensions of data that are not defined by native OLAP cube 12, and the query is therefore referred to as an (N+Q)-dimensional query. Custom hierarchy software 16 converts the (N+Q)-dimensional query to an N-dimensional query as indicated at box 22, for submission to native OLAP cube 12. It should be noted that if Q is zero (that is, if the user simply submits an N-dimensional query), custom hierarchy software 16 simply passes the query on to native OLAP cube 12. Native OLAP cube 12 processes the N-dimensional query in its ordinary manner, and returns an N-dimensional query result to custom hierarchy software 16. Custom hierarchy software 16 converts the N-dimensional query result to an (N+Q)-dimensional query result as indicated at box 24. This result is passed to application software 14, where the user is able to view the (N+Q)-dimensional query result as indicated at box 26. The entry of the query and viewing of the results by the user are performed as if the native cube was actually (N+Q)-dimensional; the conversion of the (N+Q)-dimensional query and results is seamless to the user.

System 10 further includes custom hierarchy storage 28 for storing the custom hierarchies/dimensions that are accessible to each user for submission of (N+Q)-dimensional queries. Custom hierarchy storage 28 serves as a repository for storing the definitions of the custom hierarchies that are available to each user. In some embodiments, these definitions can be dynamically augmented and updated by the user as part of the functionality of application software 14 and custom hierarchy software 16. In addition, system 10 in some embodiments may include the ability to recognize individual users, such as by user login or another mechanism, so that appropriate preferences and custom hierarchy combinations (stored in custom hierarchy storage 28, for example) may be provided to the user on an individual basis.

System 10 also has the ability to respond to meta-data requests submitted by application software 14. For example, if application software 14 is utilized to ask what dimensions or members are available for analysis, custom hierarchy software 16 is able to answer those questions as if the query is (N+Q)-dimensional, utilizing the same principles of conversion from a custom (N+Q)-dimensional query to an N-dimensional native query.

Figure 2:
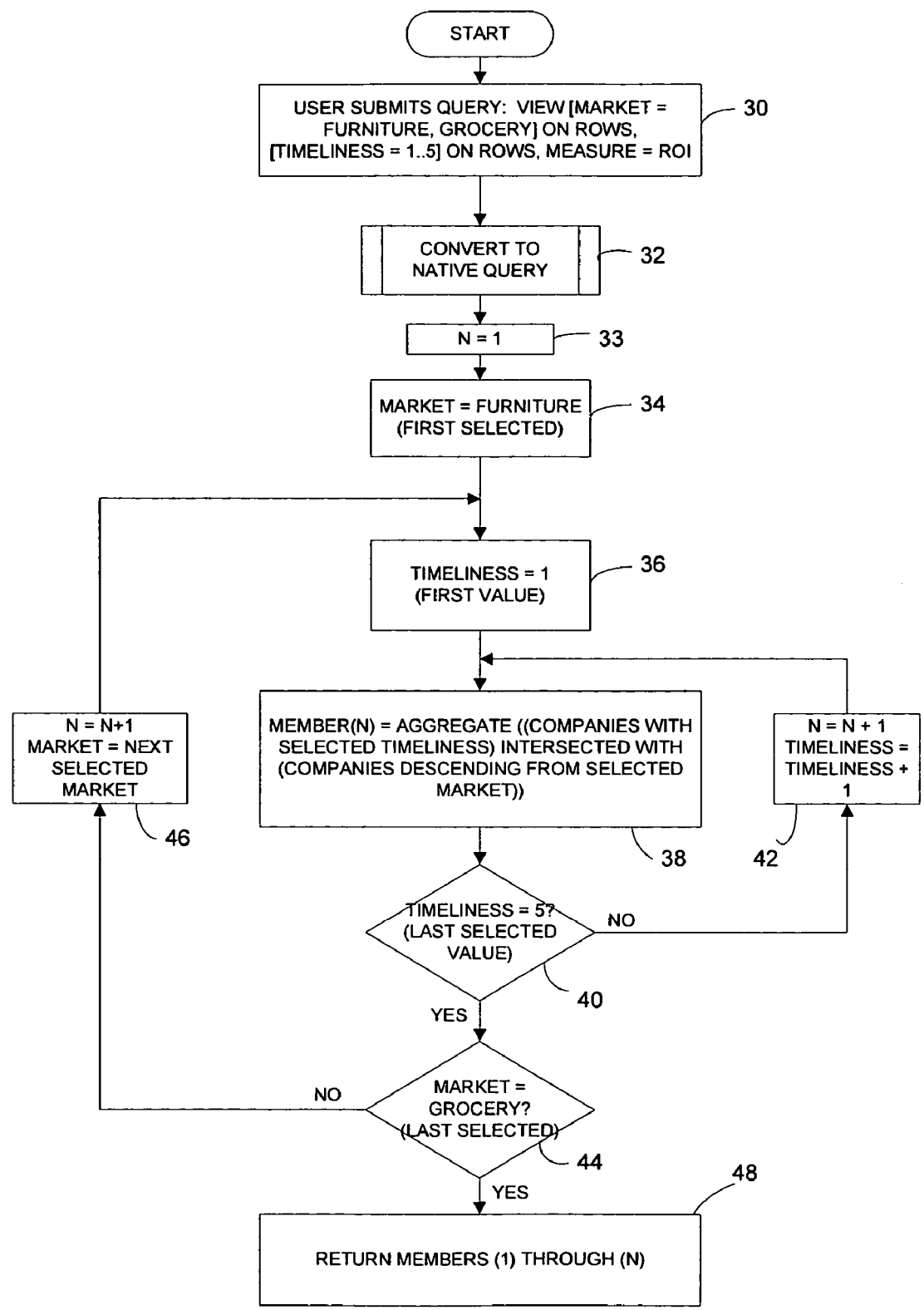
FIGS. 2–4 are flow diagrams illustrating exemplary scenarios in which the system of the present invention is employed.
Figure 3:
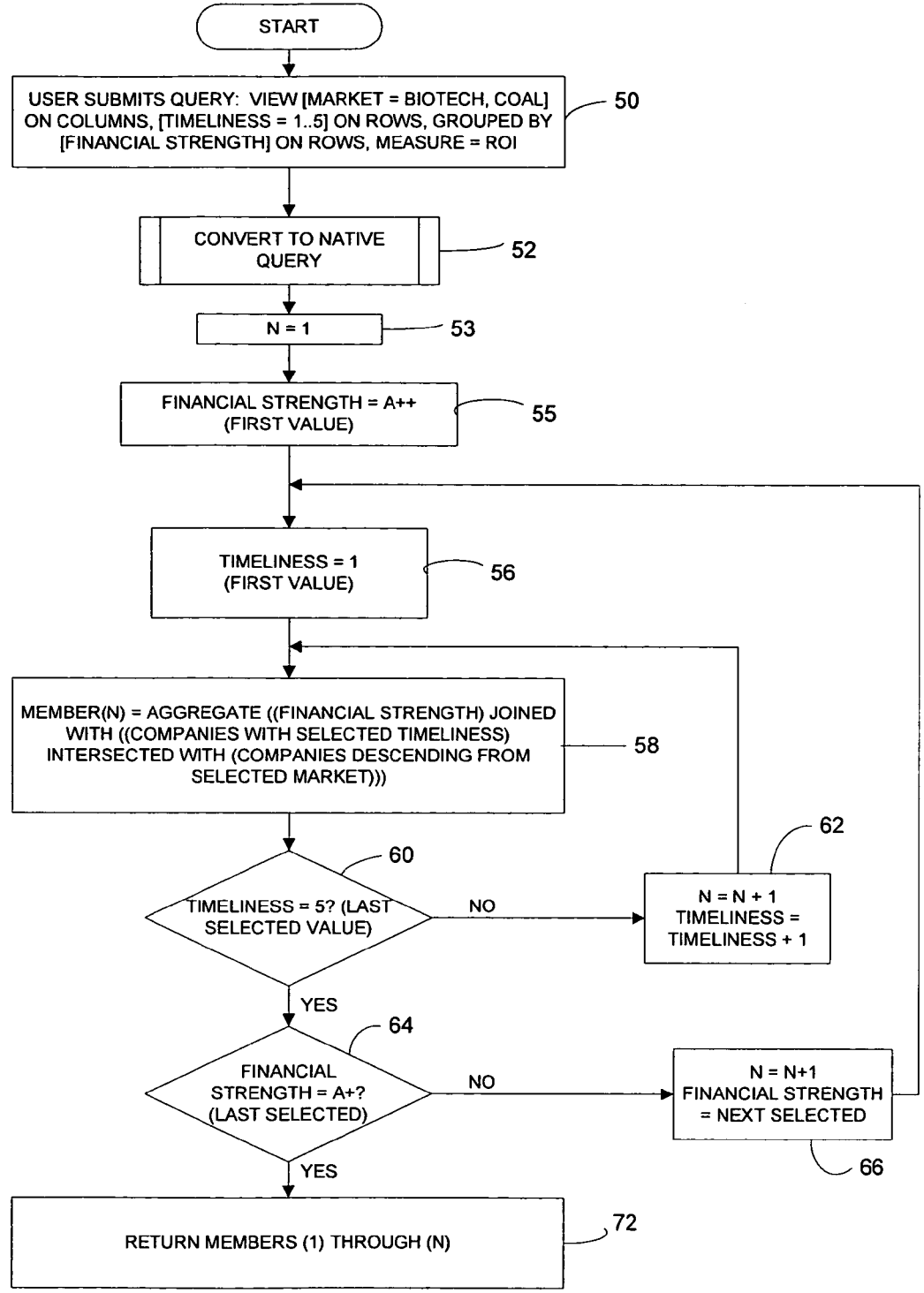
Figure 4:
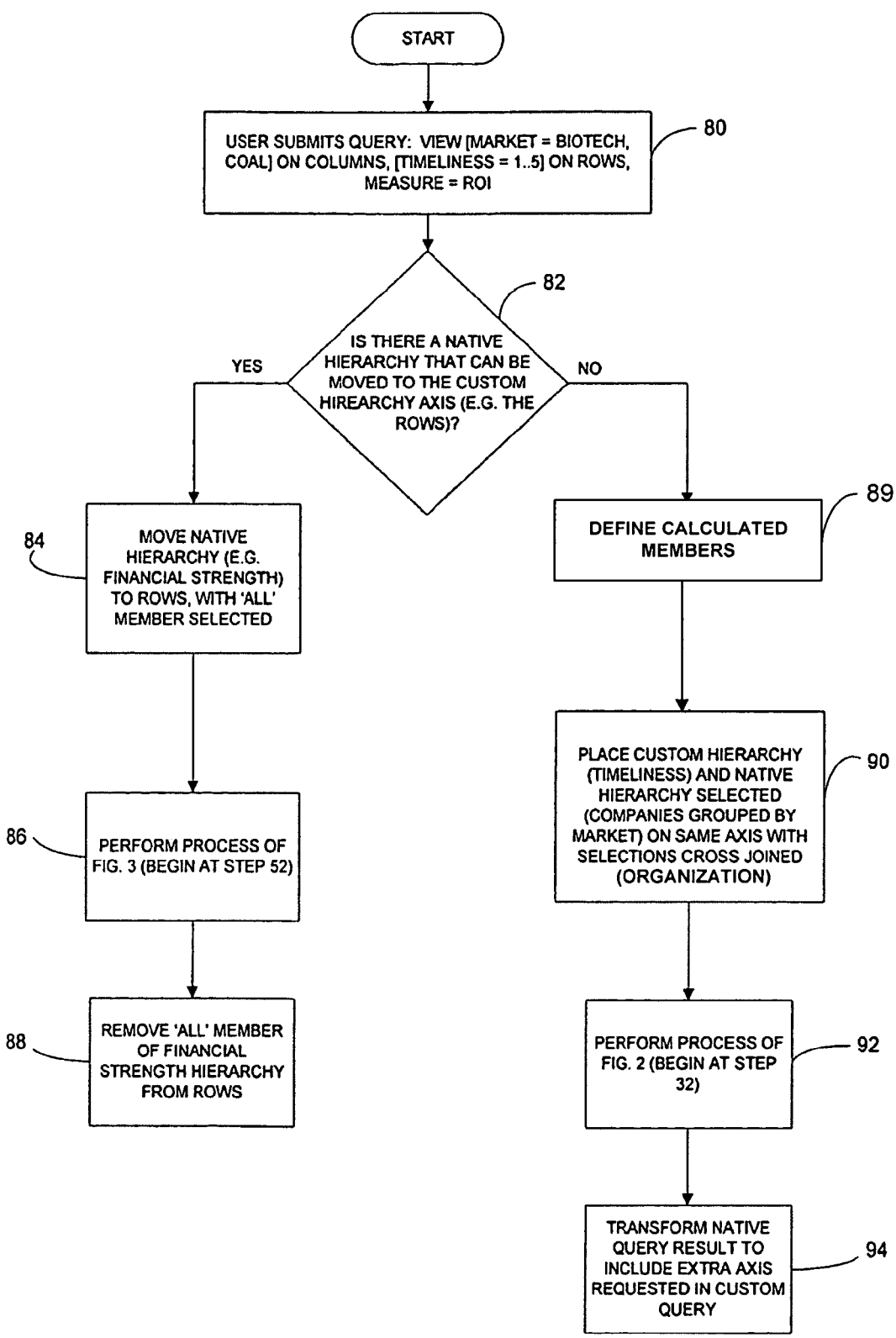

FIGS. 2–4 are flow diagrams illustrating exemplary scenarios in which the system of the present invention is employed. All three examples are set in an environment having a common native cube defined as follows:

TABLE 1

| Native Hierarchy/Dimension | Levels | Attributes |
|---|---|---|
| Company Hierarchy | All<br>>Market (Furniture, Grocery, Biotech, Coal, . . . )<br>>>Company | Timeliness (1 . . . 5) |
| Financial Strength | All<br>>Strength (A+, A++, . . . )<br>>>Company | |
| Measures | Measures (ROI) | |

EXAMPLE 1

FIG. 2

In this example, illustrated in the flow diagram of FIG. 2, the user submits a query to view the timeliness data associated with selected markets (Furniture and Grocery). Specifically, the query specifies that timeliness data be viewed on the rows (a foreground axis) of an output view, grouped by market also viewed on the rows (the same foreground axis).

As indicated at step 30 of FIG. 2, the custom query submitted by the user can be expressed as follows: View [Market=Furniture, Grocery] on rows, [Timeliness=1.5] on rows. The members of the native company hierarchy that are selected are Furniture and Grocery, and these members are groups of leaf-level members (companies) rather than leaf-level members themselves. The custom hierarchy is Timeliness, which is an attribute rather than a hierarchy in the originally defined native cube. The custom hierarchy software converts this query to a native query, with calculated members being placed on the rows axis in the native hierarchy (on the rows). Also, the custom Timeliness hierarchy retains the ability to be further drilled, unlike a simply rendered calculated member provided in response to a query in prior art systems. As a result, the user submitting the query will view the cube as having the following format (although the native cube definition itself remains unchanged), where the new dimension of the cube is shown in italics:

TABLE 2

| Hierarchy/Dimension | Levels | Attributes |
|---|---|---|
| Company Hierarchy | All<br>>Market (Furniture, Grocery, Biotech, Coal, . . . )<br>>>Company | Timeliness (1 . . . 5) |
| Financial Strength | All<br>>Strength (A+, A++, . . . )<br>>Company | |
| Timeliness | All<br>>Timeliness (1 . . . 5)<br>>>Company | |
| Measures | Measures (ROI) | |

In order to answer the query submitted by the user, the custom hierarchy software uses a multi-step process to convert the custom query into a native query, as indicated by step 32 of FIG. 2. Specifically, for the example given, a process is initiated that begins with the member number set to 1 at step 33, Market set to Furniture (the first market selected) at step 34, and timeliness set to 1 (the first timeliness value) at step 36. A calculated member for the given member number is then determined by aggregating companies with selected timeliness intersected with companies that are descendants of the selected market, as indicated by step 38. This determination continues for all values of timeliness (1–5), incrementing the member number for each determination, as indicated by decision step 40 and incrementing step 42. Once all timeliness values for the selected market have been considered, the market selection is incremented and the process repeats, as indicated by decision step 44 and incrementing step 46. After all of the calculated members have been determined, the native query returns those members (1 through N) to the custom hierarchy software, as indicated at step 48, for conversion to the format requested by the custom query.

The result of the custom query submitted by the user in this example is as follows (where blank cells indicate no data corresponding to the criteria):

TABLE 3

| | (ROI) | |
|---|---|---|
| MARKET | TIMELINESS | |
| FURNITURE | 1 | |
| | 2 | |
| | 3 | 4.61% |
| | 4 | 2.15% |
| | 5 | 7.05% |
| GROCERY | 1 | −4.36% |
| | 2 | −2.18% |
| | 3 | −2.32% |
| | 4 | −1.10% |
| | 5 | |

EXAMPLE 2

FIG. 3

In this example, illustrated in the flow diagram of FIG. 3, the user submits a query to view the timeliness data associated with selected markets (Biotech and Coal) grouped by financial strength (A+, A++). Specifically, the query specifies that the timeliness data be viewed on the rows (a foreground axis) of an output view, grouped by market on the columns (a different foreground axis) and further grouped by financial strength on the rows (the same foreground axis).

As indicated at step 50 of FIG. 3, the custom query submitted by the user can be expressed as follows: View [Market=Biotech, Coal] on columns, [Timeliness=1.5] on rows, grouped by [Financial Strength=A++, A+] on rows. The custom hierarchy software converts this query to a native query. In this scenario, a calculated member is created for each row. The formula for each member will include logic for both the financial strength selection and the timeliness selection. These members are defined to be in the financial strength hierarchy, since the custom hierarchy is on the same axis as the financial strength hierarchy. As a result, the user submitting the query will view the cube as having the following format (although the native cube definition itself remains unchanged):

TABLE 4

| Hierarchy/Dimension | Levels | Attributes |
|---|---|---|
| Company Hierarchy | All<br>>Market (Furniture, Grocery, Biotech, Coal, . . . )<br>>>Company | Timeliness (1 . . . 5) |
| Financial Strength | All<br>>Strength (A+, A++, . . . )<br>>>Company | |
| Timeliness | All<br>>Timeliness (1 . . . 5)<br>>>Company | |
| Measures | Measures (ROI) | |

In order to answer the query submitted by the user, the custom hierarchy software converts the custom query into a native query, as indicated by step 52 of FIG. 3. Specifically, for the example given, a process is initiated that begins with the member number set to 1 at step 53, Financial Strength set to A++ (the first value selected) at step 55, and timeliness set to 1 (the first timeliness value) at step 56. Each member number identifies a row to be calculated by the native OLAP server. A calculated member for the given member number is then determined by aggregating companies with selected financial strength joined with companies that have selected timeliness intersected with companies that are descendants of each selected market, as indicated by step 58. This determination continues for all values of timeliness 1–5, incrementing the member number for each determination, as indicated by decision step 60 and incrementing step 62. Once all timeliness values for the selected financial strength in each selected market have been considered, the financial strength selection is incremented and the process repeats for all the selected timeliness values again, as indicated by decision step 64 and incrementing step 66. Finally, once the calculated members have been determined for all selected financial strength values in each market, the native query returns those members (1 through N) to the custom hierarchy software, for conversion to the format requested by the custom query. Each calculated member includes the cell information for the entire row of data, as the formula executed to evaluate the calculated member represents the row header rather than the data for each individual cell of the table.

The result of the custom query submitted by the user in this example is as follows (where blank cells indicate no data corresponding to the criteria):

TABLE 5

(ROI)

| | | MARKET: | |
|---|---|---|---|
| FIN. STRENGTH | TIMELINESS | BIOTECH | COAL |
| A++ | 1 | 2.58% | 5.79% |
| | 2 | 0.35% | 2.18% |
| | 3 | 0.68% | −2.21% |
| | 4 | −1.17% | 2.82% |
| | 5 | 7.04% | |
| A+ | 1 | −0.69% | 4.25% |
| | 2 | | −1.26% |
| | 3 | 0.63% | 2.89% |
| | 4 | 1.35% | 5.84% |
| | 5 | 10.77% | |

EXAMPLE 3

FIG. 4

In this example, illustrated by the flow diagram of FIG. 4, the user submits a query to view the timeliness data associated with selected markets (Biotech and Coal). Specifically, the query specifies that timeliness data be viewed on the rows (a foreground axis) of an output view, sorted by market viewed on the columns (a different foreground axis). The custom hierarchy (timeliness) is therefore on an axis by itself.

As indicated at step 80 of FIG. 4, the custom query submitted by the user can be expressed as follows: View [Market=Biotech, Coal] on columns, [Timeliness=1.5] on rows. The custom hierarchy software converts this query to a native query, resulting in the user viewing the cube as having the following format (although the native cube definition itself remains unchanged):

TABLE 6

| Hierarchy/Dimension | Levels | Attributes/Measures |
|---|---|---|
| Company Hierarchy | All<br>>Market (Furniture, Grocery, Biotech, Coal, . . . )<br>>>Company | Timeliness (1 . . . 5) |
| Financial Strength | All<br>>Strength (A+, A++, . . . )<br>>>Company | |
| Timeliness | All<br>>Timeliness (1 . . . 5)<br>>>Company | |
| Measures | Measures (ROI) | |

In this scenario, a calculated member is created for each row. However, there is no native hierarchy on the same axis as the custom hierarchy on which to place the calculated members of the custom hierarchy. Thus, it must be determined whether a native hierarchy exists on a background axis that can be moved to the custom hierarchy foreground axis, as indicated by decision step 82. If there is such a native hierarchy available, it is moved from the background axis onto the axis where the custom hierarchy resides (in this example, the rows), as indicated by step 84. For example, in the example given, the financial strength hierarchy is moved onto the rows, with only its All member selected, solely for the purpose of providing a structure in which to place the calculated members of the custom hierarchy. The All member is selected because, in this example, the All member of the financial strength dimension was selected on the background axis (that is, no financial strength criteria was specified in the custom query). Once this movement is done, the process for creating the native query is the same as described above with respect to FIG. 3 (beginning at step 52), as indicated by step 86 in FIG. 4. If no special conversion was done, the resulting custom query answer would be as follows:

TABLE 7

| | (ROI) | | |
|---|---|---|---|
| | | MARKET: | |
| FIN. STRENGTH | TIMELINESS | BIOTECH | COAL |
| All | 1 | 1.28% | 5.33% |
| | 2 | 0.35% | 0.72% |
| | 3 | 0.65% | 0.76% |
| | 4 | 0.24% | 4.20% |
| | 5 | 8.38% | |

Once the result above is obtained, the custom hierarchy software performs an additional step to remove the All member of the financial strength hierarchy from the row selections, thereby effectively moving the financial strength hierarchy off of the foreground axis (here, the rows) and back to the background. This is shown as step 88 in FIG. 4. Thus, the final result of the custom query is as follows:

TABLE 8

| (ROI) | | |
|---|---|---|
| | MARKET: | |
| TIMELINESS | BIOTECH | COAL |
| 1 | 1.28% | 5.33% |
| 2 | 0.35% | 0.72% |
| 3 | 0.65% | 0.76% |
| 4 | 0.24% | 4.20% |
| 5 | 8.38% | |

If there is no other native hierarchy to move onto the custom hierarchy axis (that is, for the example given, if there was no financial strength hierarchy), a second approach is used. In this alternate approach, the custom hierarchy and the selected native hierarchy (in this example, companies grouped by market) are placed on the same axis with their selections cross joined (that is, all combinations of the selected members are listed), as indicated by step 90. The native query therefore has one less axis than the custom query. Once this step is taken, the conversion from custom query to native query proceeds as described above with respect to FIG. 2 (beginning at step 32), because the custom hierarchy (Timeliness) and the native hierarchy (Company Hierarchy) are on the same axis. This is shown as step 92 in FIG. 4. This query yields the following result:

TABLE 9

| (ROI) | | | | | | | | | |
|---|---|---|---|---|---|---|---|---|---|
| BIOTECH | | | | | COAL | | | | |
| 1 | 2 | 3 | 4 | 5 | 1 | 2 | 3 | 4 | 5 |
| 1.28% | 0.35% | 0.65% | 0.24% | 8.38% | 5.33% | 0.72% | 0.76% | 4.20% | |

Once the execution of the query is complete, the result is transformed by the custom hierarchy software to include the extra axis (in this example, the rows), as indicated by step 94, so that the result looks exactly like Table 8 above. This conversion is not particularly difficult, because each cell of the native query result has a 1-to-1 mapping relationship with a cell of the custom query. Both queries return the same results with the same number of cells; the only difference is in the organization of the cells, which is able to be manipulated by the custom hierarchy software.

The examples described above illustrate the ability of the present invention to evaluate anew dimension of data as a custom hierarchy that is not defined as a hierarchy in the native OLAP cube. The custom hierarchy can be based on any data that is stored in the native OLAP cube, including attributes of members of a native hierarchy, groups of members in a native hierarchy, or measures associated with members of a native hierarchy, for example. The members of the custom hierarchy can also be based on any formulas utilizing meta-data from the native OLAP cube. The custom hierarchy is created with the ability to be further drilled, due to the ability of custom hierarchy software to convert all queries associated with the custom hierarchy into native queries that are executed by the native OLAP server. One or more custom hierarchy definitions can be saved and stored for later use as well. As a result, analysts have the ability to generate customized views and structures of data for the purposes relevant to their analysis without burdening the overall cube maintenance systems and personnel with the task of modifying the native OLAP cube definition.

Although the present invention has been described with reference to preferred embodiments, workers skilled in the art will recognize that changes maybe made in form and detail without departing from the spirit and scope of the invention.

The invention claimed is:

1. A method to be executed at least in part by a software program in a computing device for analyzing data in an N-dimensional native OLAP cube, comprising:
submitting an (N+Q)-dimensional custom query, wherein N and Q are both positive numbers greater than zero;
converting the (N+Q)-dimensional custom query into an N-dimensional query for submission to the N-dimensional native OLAP cube by:
defining at least one custom hierarchy corresponding to dimensions specified in the (N+Q)-dimensional custom query that are not defined in the N-dimensional native OLAP cube, the custom hierarchy having an axis specified in the (N+Q)-dimensional custom query;

identifying a common query axis for execution of the N-dimensional query, the common query axis including a native hierarchy and the custom hierarchy;

defining calculated members in the N-dimensional query representing the custom hierarchy, corresponding to criteria of the (N+Q)-dimensional custom query and the native hierarchy on the common query axis; and organizing the calculated members according to the (N+Q)-dimensional custom query;

receiving an N-dimensional result of the N-dimensional query;

converting the N-dimensional result of the N-dimensional query into an (N+Q)-dimensional result of the (N+Q)-dimensional custom query; and providing the (N+Q) dimensional result of the (N+Q)-dimensional query.

2. The method of claim 1, wherein converting the N-dimensional result of the N-dimensional query into an (N+Q)-dimensional result of the (N+Q)-dimensional query comprises:

defining at least one custom hierarchy corresponding to dimensions specified in the (N+Q)-dimensional custom query that are not defined in the N-dimensional native OLAP cube, the custom hierarchy having an axis specified in the (N+Q)-dimensional custom query;

identifying the common query axis for execution of the N-dimensional query, the common query axis including the native hierarchy and the custom hierarchy;

defining calculated members in the N-dimensional query representing the custom hierarchy, corresponding to the criteria of the (N+Q)-dimensional custom query and the native hierarchy on the common query axis; and organizing the calculated members according to the (N+Q)-dimensional custom query.

3. The method of claim 2, wherein identifying the common query axis for execution of the N-dimensional query comprises:

determining whether the (N+Q)-dimensional custom query specifies a native hierarchy having a common axis with the specified axis of the custom hierarchy, for identification as the common query axis;

if the (N+Q)-dimensional custom query does not specify a native hierarchy having a common axis with the specified axis of the custom hierarchy, moving a native hierarchy to the specified axis of the custom hierarchy upon determination that a native hierarchy exists which can be moved to the specified axis of the custom hierarchy, so that the common query axis is identified as the specified axis of the custom hierarchy; and if no native hierarchy exists which can be moved to the specified axis of the custom hierarchy, placing the custom hierarchy on an axis of a native hierarchy specified by the (N+Q)-dimensional custom query having no common axis with the specified axis of the custom hierarchy, with selections of the native hierarchy and the custom hierarchy cross joined, so that the common query axis is identified as the axis of the native hierarchy specified by the (N+Q)-dimensional custom query.

4. The method of claim 3, wherein identification of the common query axis as the axis of the native hierarchy specified by the (N+Q)-dimensional custom query having no common axis with the specified axis of the custom hierarchy, results in the step of organizing the calculated members according to the (N+Q)-dimensional custom query comprising:

transforming the calculated members corresponding to the criteria of the (N+Q)-dimensional custom query and the native hierarchy on the common query axis to include the specified axis of the custom hierarchy.

5. The method of claim 2, further comprising:

storing a definition of the at least one custom hierarchy in a memory separate from the native OLAP cube.

6. The method of claim 5, further comprising:

identifying an individual user; and providing at least one selected definition of the at least one custom hierarchy stored in the memory based on the user's identity.

7. The method of claim 2, wherein the criteria of the (N+Q)-dimensional query comprises specifying a group of members of a native hierarchy.

8. The method of claim 7, wherein the specified group of members of the native hierarchy are specified by having common attributes.

9. The method of claim 7, wherein the specified group of members of the native hierarchy are specified by having measures that satisfy specified requirements.

10. The method of claim 2, wherein the criteria of the (N+Q)-dimensional query comprises specifying at least one formula based on meta-data from the native OLAP cube that members of the custom hierarchy must satisfy.

11. A system for analyzing data in an N-dimensional native OLAP cube, comprising:

a memory separate from the OLAP cube for storing a definition of at least one custom hierarchy;

application software for specifying a custom query and viewing a result of the custom query, the custom query and the result of the custom query having (N+Q) dimensions, wherein N and Q are both positive numbers greater than zero; and custom hierarchy software logically connected between the application software and the N-dimensional native OLAP cube, the custom hierarchy software being operable to:

convert the custom query into an N-dimensional query for submission to the N-dimensional native OLAP cube by defining at least one custom hierarchy corresponding to dimensions specified in the (N+Q)-dimensional custom query that are not defined in the N-dimensional native OLAP cube;

receive an N-dimensional result of the N-dimensional query; and convert the N-dimensional result of the N-dimensional query into the (N+Q)-dimensional result of the custom query.

12. The system of claim 11, wherein the custom hierarchy software converts the N-dimensional result of the N-dimensional query into the (N+Q)-dimensional result of the custom query by defining at least one custom hierarchy corresponding to dimensions specified in the (N+Q)-dimensional custom query that are not defined in the N-dimensional native OLAP cube.

13. The system of claim 12, wherein the at least one custom hierarchy comprises at least one calculated member determined by identifying at least one member of a native hierarchy of the native OLAP cube corresponding to criteria specified in the (N+Q)-dimensional custom query.

14. The system of claim 13, wherein the at least one calculated member of the at least one custom hierarchy is able to be further drilled.

15. The system of claim 12, wherein the criteria specified in the (N+Q)-dimensional custom query is selected from the group consisting of selected members of a native hierarchy having common attributes, selected members of a native hierarchy having measures that satisfy specified requirements, and selected members of a native hierarchy identified by name in the custom query.

16. The system of claim 12, wherein the criteria specified in the (N+Q)-dimensional custom query comprises specifying at least one formula based on meta-data from the native OLAP cube that members of the custom hierarchy must satisfy.

17. The system of claim 11, wherein the application software is operable to provide at least one selected definition of the at least one custom hierarchy stored in the memory based on the identification of a user.

18. A method to be executed at least in part by a software program in a computing device for converting an (N+Q)-dimensional custom query into an N-dimensional query for execution by an N-dimensional native OLAP cube, wherein N and Q are both positive numbers greater than zero, the method comprising:

defining at least one custom hierarchy corresponding to dimensions specified in the (N+Q)-dimensional custom query that are not defined in the N-dimensional native OLAP cube, the custom hierarchy having an axis specified in the (N+Q)-dimensional custom query;

identifying a common query axis for execution of the N dimensional query, the common query axis including a native hierarchy and the custom hierarchy;

defining calculated members in the N-dimensional query representing the custom hierarchy, corresponding to criteria of the (N+Q)-dimensional custom query and the native hierarchy on the common query axis;

organizing the calculated members according to the (N+Q)-dimensional custom query;

determining whether the (N+Q)-dimensional custom query specifies a native hierarchy having a common axis with the specified axis of the custom hierarchy, for identification as the common query axis;

if the (N+Q)-dimensional custom query does not specify a native hierarchy having a common axis with the specified axis of the custom hierarchy, moving a native hierarchy to the specified axis of the custom hierarchy upon determination that a native hierarchy exists which can be moved to the specified axis of the custom hierarchy, so that the common query axis is identified as the specified axis of the custom hierarchy; and if no native hierarchy exists which can be moved to the specified axis of the custom hierarchy, placing the custom hierarchy on an axis of a native hierarchy specified by the (N+Q)-dimensional custom query having no common axis with the specified axis of the custom hierarchy, with selections of the native hierarchy and the custom hierarchy cross joined, so that the common query axis is identified as the axis of the native hierarchy specified by the (N+Q)-dimensional custom query.

19. The method of claim 18, wherein identification of the common query axis as the axis of the native hierarchy specified by the (N+Q)-dimensional custom query having no common axis with the specified axis of the custom hierarchy, results in the step of organizing the calculated members according to the (N+Q)-dimensional custom query comprising:

transforming the calculated members corresponding to the criteria of the (N+Q)-dimensional custom query and the native hierarchy on the common query axis to include the specified axis of the custom hierarchy.

20. The method of claim 18, further comprising:

storing a definition of the at least one custom hierarchy in a memory separate from the native OLAP cube.

21. The method of claim 20, further comprising:

identifying an individual user; and providing at least one selected definition of the at least one custom hierarchy stored in the memory based on the user's identity.

\* \* \* \* \*